(12) United States Patent
Jurik et al.

(10) Patent No.: US 11,703,213 B2
(45) Date of Patent: Jul. 18, 2023

(54) BRAKING SYSTEM FOR AN AUTOMATED LUMINAIRE

(71) Applicant: Robe Lighting s.r.o., Roznov pod Radhostem (CZ)

(72) Inventors: Pavel Jurik, Prostredni Becva (CZ); Jindrich Vavrik, Zubri (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 62 days.

(21) Appl. No.: 17/200,477

(22) Filed: Mar. 12, 2021

(65) Prior Publication Data

US 2021/0199273 A1 Jul. 1, 2021

Related U.S. Application Data

(63) Continuation-in-part of application No. 17/011,554, filed on Sep. 3, 2020, now Pat. No. 10,969,091.

(Continued)

(51) Int. Cl.
*F21V 21/15* (2006.01)
*F21V 21/30* (2006.01)
(Continued)

(52) U.S. Cl.
CPC ............. *F21V 21/15* (2013.01); *F21V 14/02* (2013.01); *F21V 21/30* (2013.01); *F21V 23/003* (2013.01); *F21W 2131/406* (2013.01)

(58) Field of Classification Search
CPC .......... F21V 21/15; F21V 21/30; F21V 14/02; F21V 23/003; F21W 2131/406; H02P 29/04; H02P 8/30; H02P 3/04
See application file for complete search history.

(56) References Cited

U.S. PATENT DOCUMENTS

| 5,850,579 A | 12/1998 | Melby et al. |
| 6,520,484 B1 * | 2/2003 | Shimizu ................. F21V 21/38 254/276 |

(Continued)

FOREIGN PATENT DOCUMENTS

| CN | 102460001 A | 5/2012 |
| CN | 108474591 A | 8/2018 |

(Continued)

OTHER PUBLICATIONS

Notice of Allowance date Dec. 8, 2020, U.S. Appl. No. 17/011,554, filed Sep. 3, 2020, 10 pages.

(Continued)

*Primary Examiner* — Zheng Song
(74) *Attorney, Agent, or Firm* — Conley Rose, P.C.; Brooks W Taylor

(57) ABSTRACT

A luminaire is provided that includes a head, a movement system, and a control system. The movement system rotates the luminaire head around an axis of rotation. The movement system includes a motor and a braking system. The motor moves a luminaire mechanism. The luminaire mechanism may be a gobo wheel, a lens, or other optical device of the luminaire, or it may be the luminaire head or the luminaire yoke. The control system determines whether the motor is rotating and engages the braking system when the motor is not rotating. When the motor is stopped, the control system may store in non-volatile memory a current absolute position of the luminaire mechanism.

23 Claims, 11 Drawing Sheets

Related U.S. Application Data

(60) Provisional application No. 62/895,361, filed on Sep. 3, 2019.

(51) Int. Cl.
*F21V 23/00* (2015.01)
*F21V 14/02* (2006.01)
*F21W 131/406* (2006.01)

(56) References Cited

U.S. PATENT DOCUMENTS

| | | | |
|---|---|---|---|
| 8,201,974 B1 | 6/2012 | Smith et al. | |
| 8,764,252 B2 | 7/2014 | Evans | |
| 8,845,150 B2* | 9/2014 | Brutsche | F21V 21/15 362/426 |
| 2004/0165385 A1* | 8/2004 | Belliveau | H05B 47/155 362/286 |
| 2007/0019947 A1* | 1/2007 | Shimada | G03B 35/00 396/329 |
| 2007/0285034 A1* | 12/2007 | Aizawa | B41J 29/38 318/696 |
| 2009/0323363 A1* | 12/2009 | Evans | F21V 21/06 362/386 |
| 2011/0164428 A1* | 7/2011 | Brutsche | F21V 21/108 362/427 |
| 2011/0261568 A1* | 10/2011 | Dalsgaard | F21V 21/30 362/249.03 |
| 2013/0201686 A1* | 8/2013 | Dalsgaard | F21V 21/14 362/249.1 |
| 2013/0201703 A1* | 8/2013 | Dalsgaard | F21V 21/30 362/427 |
| 2014/0009949 A1 | 1/2014 | Evans | |
| 2014/0177258 A1* | 6/2014 | Gebhard | B60Q 1/245 362/547 |
| 2015/0003099 A1* | 1/2015 | Rasmussen | F21S 10/00 362/523 |
| 2015/0062861 A1 | 3/2015 | Yamashita | |
| 2017/0074488 A1* | 3/2017 | Fujisawa | F21S 8/04 |
| 2017/0130945 A1* | 5/2017 | Kitano | F21V 21/28 |
| 2018/0112859 A1* | 4/2018 | Yamamoto | F21V 21/30 |
| 2020/0278080 A1* | 9/2020 | Erens | A61B 90/37 |
| 2020/0300445 A1* | 9/2020 | Fujisawa | F21V 21/30 |
| 2020/0400294 A1 | 12/2020 | Jurik et al. | |

FOREIGN PATENT DOCUMENTS

| | | |
|---|---|---|
| CN | 210831581 U | 6/2020 |
| CN | 210831883 U | 6/2020 |
| EP | 1001212 A2 | 5/2000 |
| EP | 3789669 A1 | 3/2021 |

OTHER PUBLICATIONS

European Extended Search Report dated Feb. 2, 2021; Application No. 20194175.4 filed on Sep. 3, 2019; 5 pages.
European Examination Report; Application No. 20194175.4; dated Dec. 15, 2021; 4 pages.
European Extended Search Report; Application No. 21193888.1; dated Jan. 17, 2022; 9 pages.
Chinese Notice of Allowance; Application No. 202010917471.4; dated Jun. 6, 2022; 5 pages.

* cited by examiner

BRAKING SYSTEM FOR AN AUTOMATED LUMINAIRE

CROSS-REFERENCE TO RELATED APPLICATIONS

The present application is a continuation-in-part of and claims priority to U.S. patent application Ser. No. 17/011,554, filed on Sep. 3, 2020 by Pavel Jurik, et al. entitled, "Braking System for Automated Luminaires", which claims the benefit of priority to U.S. Provisional Application No. 62/895,361 filed on Sep. 3, 2019 by Pavel Jurik, et al. entitled, "Braking System for Automated Luminaires", both of which are incorporated by reference herein as if reproduced in their entirety.

TECHNICAL FIELD OF THE DISCLOSURE

The disclosure generally relates to automated luminaires, and more specifically to a method for deploying and controlling brakes on the pan and tilt axes of an automated luminaire.

BACKGROUND

Luminaires with automated and remotely controllable functionality (referred to as automated luminaires) are well known in the entertainment and architectural lighting markets. Such products are commonly used in theatres, television studios, concerts, theme parks, night clubs, and other venues. A typical automated luminaire provides control from a remote location of the pan and tilt functions of the luminaire allowing an operator to control the direction the luminaire is pointing and thus the position of the light beam on the stage or in the studio. Typically, this position control is done via control of the luminaire's position in two orthogonal rotational axes usually referred to as pan and tilt. Many automated luminaires additionally or alternatively provide control from the remote location of other parameters such as intensity, focus, beam size, beam shape, and/or beam pattern of light beam(s) emitted from the luminaire.

SUMMARY

In a first embodiment, a luminaire includes a luminaire head, a movement system, and a control system. The luminaire head includes one or more optical devices. The movement system is mechanically coupled to the luminaire head and is configured to rotate the luminaire head around an axis of rotation. The movement system includes a motor and a braking system. The motor includes a motor shaft with a first part extending from a first side of the motor, the first part of the motor shaft is coupled by a mechanical coupling to the luminaire head and is configured to rotate the luminaire head about the axis of rotation. The braking system is coupled by a second mechanical coupling to the motor shaft and is configured to inhibit rotation of the luminaire head. The control system is electrically coupled to the motor and the braking system and is configured to engage the braking system by determining whether the motor is rotating, and engaging the braking system when the motor is not rotating.

In a second embodiment, a luminaire includes a luminaire head, a movement system, and a control system. The luminaire head includes one or more optical devices. The movement system is mechanically coupled to one of the one or more optical devices and configured to move the optical device. The movement system includes a motor and a braking system. The motor includes a motor shaft with a first part extending from a first side of the motor, the first part of the motor shaft is coupled by a mechanical coupling to the optical device and is configured to move the optical device. The braking system is coupled by a second mechanical coupling to the optical device and is configured to inhibit movement of the optical device. The control system is electrically coupled to the motor and the braking system and is configured to engage the braking system by determining whether the motor is rotating, and engaging the braking system when the motor is not rotating.

In a third embodiment, a luminaire includes a luminaire head, a movement system, and a control system. The luminaire head includes one or more optical devices. The movement system is mechanically coupled to a luminaire mechanism of the luminaire and is configured to move the luminaire mechanism. The movement system includes a motor and a braking system. The motor includes a motor shaft with a first part extending from a first side of the motor, the first part of the motor shaft is coupled by a mechanical coupling to the luminaire mechanism and is configured to move the luminaire mechanism. The braking system is coupled by a second mechanical coupling to the luminaire mechanism and is configured to inhibit movement of the luminaire mechanism. The control system is electrically coupled to the motor, the braking system, and a non-volatile memory and is configured to engage the braking system by determining whether the motor is rotating, and, upon determining that the motor is not rotating, engaging the braking system and storing in the non-volatile memory a current absolute position of the luminaire mechanism.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments are illustrated in the figures, like numerals being used to refer to like and corresponding parts of the various drawings.

Figure 1:
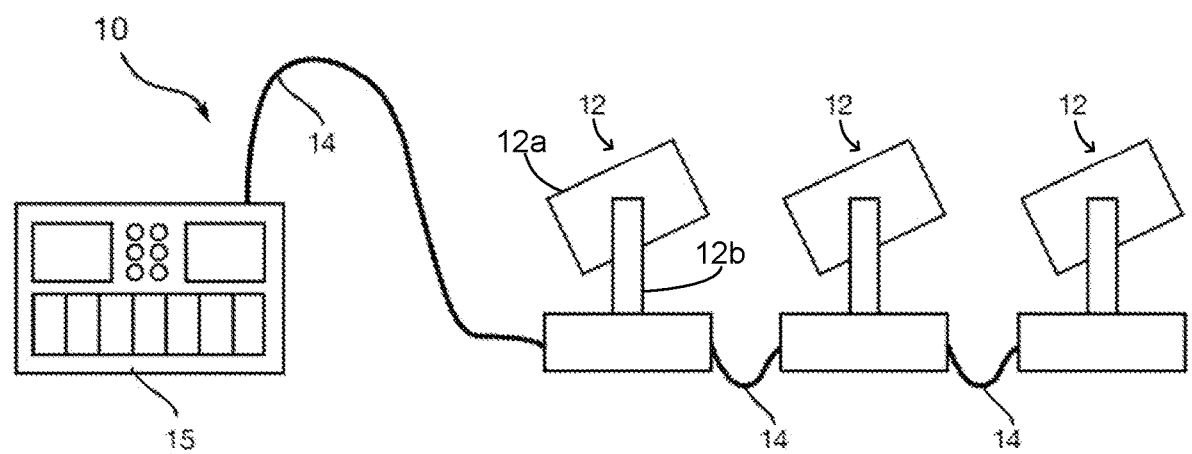
FIG. 1 presents a schematic view of an automated luminaire system according to the disclosure.

FIG. 1 presents a schematic view of a luminaire system 10 according to the disclosure. The luminaire system 10 includes a plurality of luminaires 12 according to the disclosure. The luminaires 12 each contains on-board a light source, one or more of color changing systems, light modulation devices, and pan and/or tilt systems to control an orientation of a head of the luminaire 12. Mechanical drive systems to control parameters of the luminaire 12 include motors or other suitable actuators coupled to a control system, as described in more detail with reference to FIG. 2, which is configured to control the motors or other actuators.

The luminaire 12 includes a luminaire head 12a mounted in a yoke 12b. The yoke 12b rotates around a pan axis of rotation (vertical in the plane of the page in FIG. 1). The luminaire head 12a rotates within the yoke 12b around a tilt axis of rotation (perpendicular to the page in FIG. 1).

In addition to being connected to mains power either directly or through a power distribution system, the control system of each luminaire 12 is connected in series or in parallel by a data link 14 to one or more control desks 15. Upon actuation by an operator, the control desk 15 sends control signals via the data link 14, where the control signals are received by the control system of one or more of the luminaires 12. The control systems of the one or more of the luminaires 12 that receive the control signals may respond by changing one or more of the parameters of the receiving luminaires 12. The control signals are sent by the control desk 15 to the luminaires 12 using DMX-512, Art-Net, ACN (Architecture for Control Networks), Streaming ACN, or other suitable communication protocol.

The luminaire head 12a comprises one or more optical systems, which include optical devices such as gobo wheels, effects wheels, and color mixing (or other color changing) systems, as well as prism, iris, shutter, and lens movement systems. Some or all of the optical systems include stepper motors or other actuators to cause movement of their associated optical system. The stepper motors and/or actuators of the luminaire head 12a are electrically coupled to and under the control of the control system of the luminaire 12.

Automated luminaires 12 may also include stepper motors or servo motors to cause pan and tilt movement of the luminaire head to position its emitted beam where required on a stage. In some luminaires, the head may be pushed out of position by an external force while power is removed from the pan and/or tilt motors. In other luminaires, the head is unbalanced or likely to move under gravity for some other reason while power is removed from the motors. In some luminaires, an optical device may be moved out of position by an external force such as gravity while power is removed from the optical device movement system motor(s).

Where such luminaires include servo motors, the servo motor is typically coupled to the luminaire head through a gear reduction drive, which holds the head in position even when power is not being applied to the servo motor. Where such luminaires include stepper motors, the head may be maintained in a constant orientation by applying power to the pan and/or tilt stepper motors at all times to hold the motor(s) in position. During design of such a luminaire, the forces experienced by a head in its most unbalanced configuration may be determined, and the current needed to be applied to the motor(s) to hold the head in position against this imbalance also determined. Such a current is typically referred to as a "holding current." The holding current is less than a current required to cause motion of the luminaire head.

In automated luminaires according to the disclosure, the pan and tilt positions of a luminaire head remain fixed even when power is removed from the pan/tilt motors. Also in such automated luminaires, the operator is able to lock the pan and tilt in position without using motor power. For example, in some scenarios an automated luminaire may be installed in a position where the luminaire head can move and strike a piece of scenery. In such a scenario, the operator may desire to lock down the luminaire head of an automated luminaire according to the disclosure to prevent the luminaire head from hitting that piece of scenery, whether or not the automated luminaire is powered up. In other scenarios (for example in theatre productions, trade shows, or TV shows), an automated luminaire may be used as a repositionable luminaire—i.e., one whose position and pan/tilt orientation is set once, during set-up, and then its pan/tilt orientation is not altered during the production. In such scenarios, an automated luminaire according to the disclosure is configured to lock the pan and tilt motion for the duration of the production, to ensure that the pan/tilt orientation of the luminaire head does not change.

Figure 2:
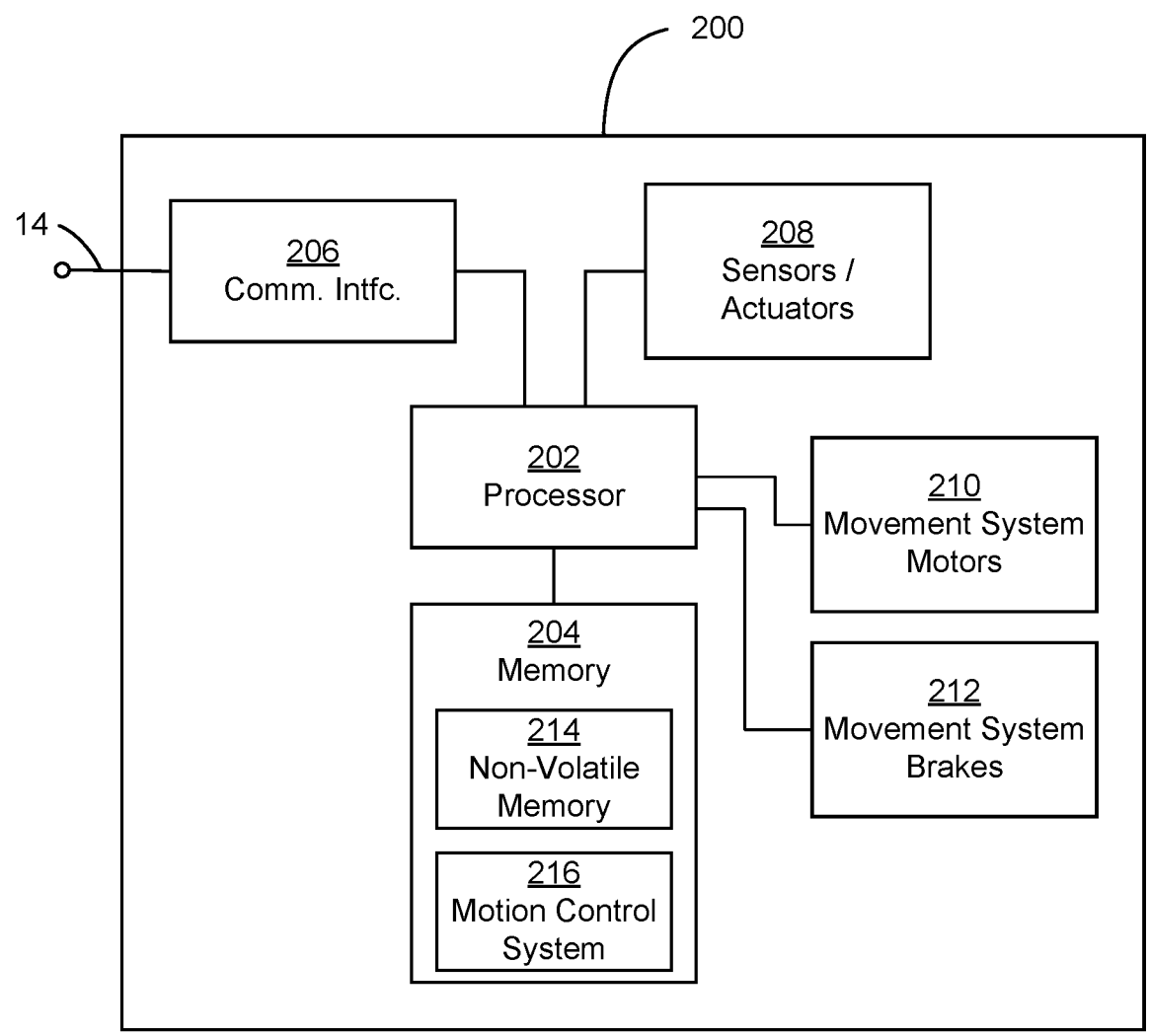
FIG. 2 presents a block diagram of a control system according to the disclosure.

FIG. 2 presents a block diagram of a control system (or controller) 200 according to the disclosure. The control system 200 is suitable for use to control the pan and tilt movement systems 301 and 311 of FIG. 3 and other luminaire head movement systems according to the disclosure. The control system 200 is also suitable for controlling the light source, color changing devices, light modulation devices, optical device movement, pan and/or tilt systems, and other control functions of the automated luminaires 12.

The control system 200 includes a processor 202 electrically coupled to a memory 204. The processor 202 is implemented by hardware and software. The processor 202 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 202 is further electrically coupled to and in communication with a communication interface 206. The communication interface 206 is coupled to, and configured to communicate via, the data link 14. The processor 202 is also coupled via a control interface 208 to one or more sensors, motors, actuators, controls and/or other devices. The processor 202 is configured to receive control signals from the data link 14 via the communication interface 206 and, in response, to control systems and mechanisms of the automated luminaire 12 via the control interface 208.

The processor 202 is further electrically coupled to and in communication with movement system motors 210 and movement system brakes 212 to control movement of mechanisms of the automated luminaire 12 (luminaire mechanisms). The control system 200 is suitable for implementing processes, module control, optical device control, luminaire mechanism movement control, parameter control, motor control, brake control, and other functionality as disclosed herein, which may be implemented as instructions stored in the memory 204 and executed by the processor 202. The memory 204 comprises one or more disks and/or solid-state drives and may be used to store instructions and data that are read and written during program execution. The memory 204 may be volatile and/or non-volatile and may be read-only memory (ROM), random access memory (RAM), ternary content-addressable memory (TCAM), and/or static random-access memory (SRAM).

Movement systems according to the disclosure may be used to control movement of luminaire mechanisms of the luminaire 12 such as gobo wheels, lenses, and other optical devices of the luminaire head 12a, as well as the luminaire yoke 12b relative to a fixed portion of the luminaire 12 and the luminaire head 12a relative to the luminaire yoke 12b.

Figure 3:
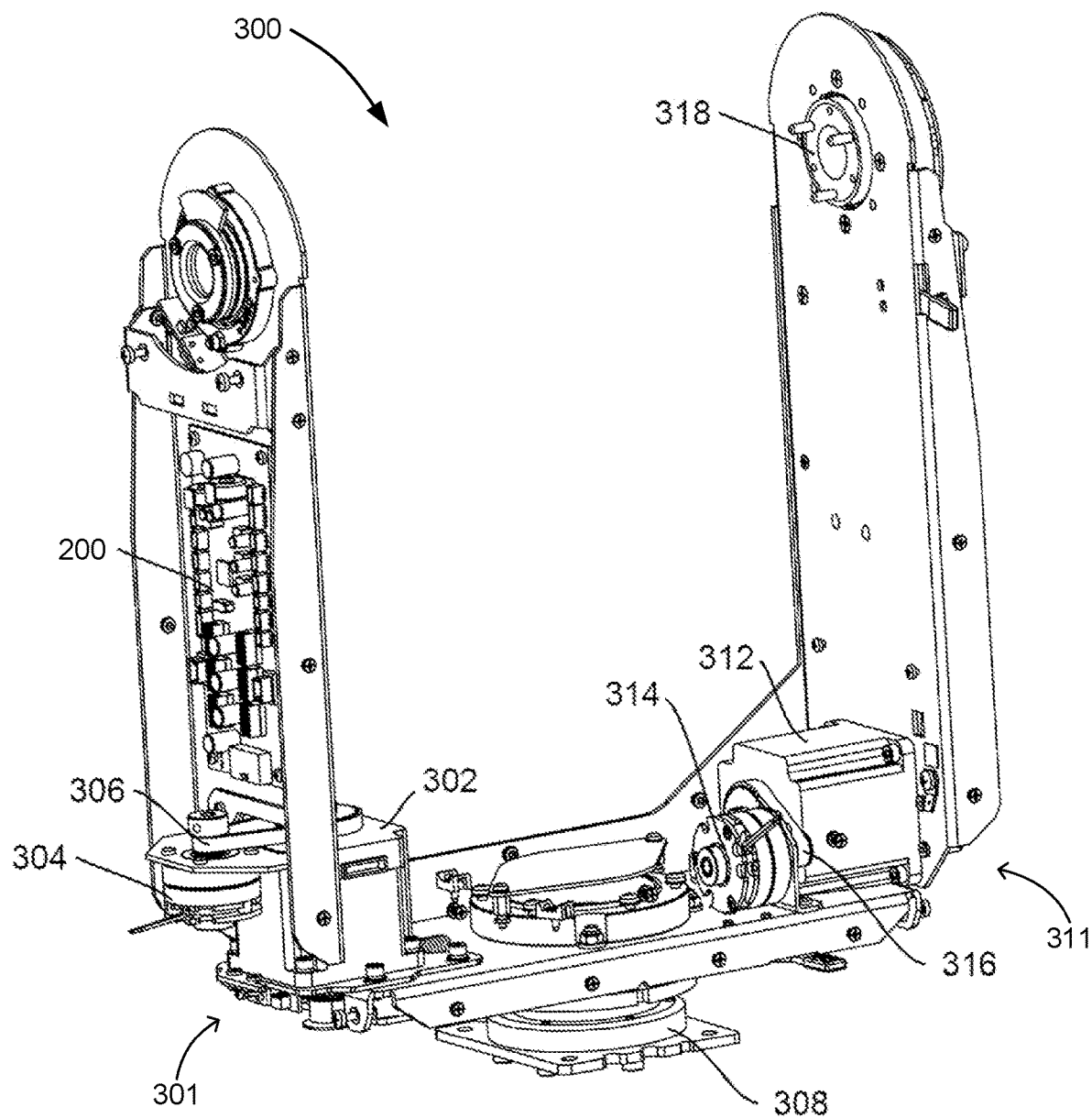
FIG. 3 presents a view of a pan and tilt yoke of an automated luminaire according to the disclosure.

FIG. 3 presents a view of a pan and tilt yoke 300 of the automated luminaire 12 according to the disclosure. The pan and tilt yoke 300 provides for rotation of a luminaire head of the automated luminaire 12. The pan and tilt yoke 300 includes a pan movement system 301 and a tilt movement system 311. The pan movement system 301 comprises a pan motor 302, which is a stepper motor, direct current (DC) servo motor, or other suitably powerful motor type. The pan motor 302 is configured to cause rotation of the pan and tilt yoke relative to a fixed support around a pan axis of rotation passing through a bearing 308. A motor shaft of the pan motor 302 extends from opposite sides of the pan motor 302. A first end of the motor shaft of the pan motor 302 is coupled via a drive mechanism such as a belt or gear train to an element of the bearing 308 to rotate the pan and tilt yoke about a pan axis relative to the fixed support. A second end of the motor shaft of the pan motor 302 is mechanically coupled via a belt 306 to a pan braking system 304. The pan braking system 304 is an electrically controllable brake using a magnetic system to provide braking torque to inhibit or prevent rotation of the pan and tilt yoke (and thus the luminaire head) by inhibiting or preventing rotation of the motor shaft of the pan motor 302.

The tilt movement system 311 comprises a tilt motor 312. The tilt motor 312 is a stepper motor, DC servo motor, or other suitably powerful motor type. The tilt motor 312 is configured to cause rotation of a luminaire head (not shown in FIG. 3) relative to the pan and tilt yoke 300 around a tilt axis of rotation passing through a bearing 318. The tilt axis of rotation is orthogonal to the pan axis of rotation. A motor shaft of the tilt motor 312 extends from opposite sides of the tilt motor 312. A first end of the motor shaft of the tilt motor 312 is coupled via a drive mechanism such as a belt or gear train to an element of the bearing 318 to rotate the luminaire head about a tilt axis relative to the pan and tilt yoke 300. A second end of the motor shaft of the tilt motor 312 is mechanically coupled via a belt 316 to a tilt braking system 314. The tilt braking system 314 is an electrically controllable brake using a magnetic system to provide braking torque to inhibit or prevent rotation of the luminaire head by inhibiting or preventing rotation of the motor shaft of the tilt motor 312.

As described with reference to FIG. 2, the control system 200 is coupled to sensors, actuators, the pan and tilt motors 302 and 312, and (in some embodiments) the pan and/or tilt braking systems 304 and 314 to control the pan and tilt motion of the pan and tilt yoke 300.

Figure 4:
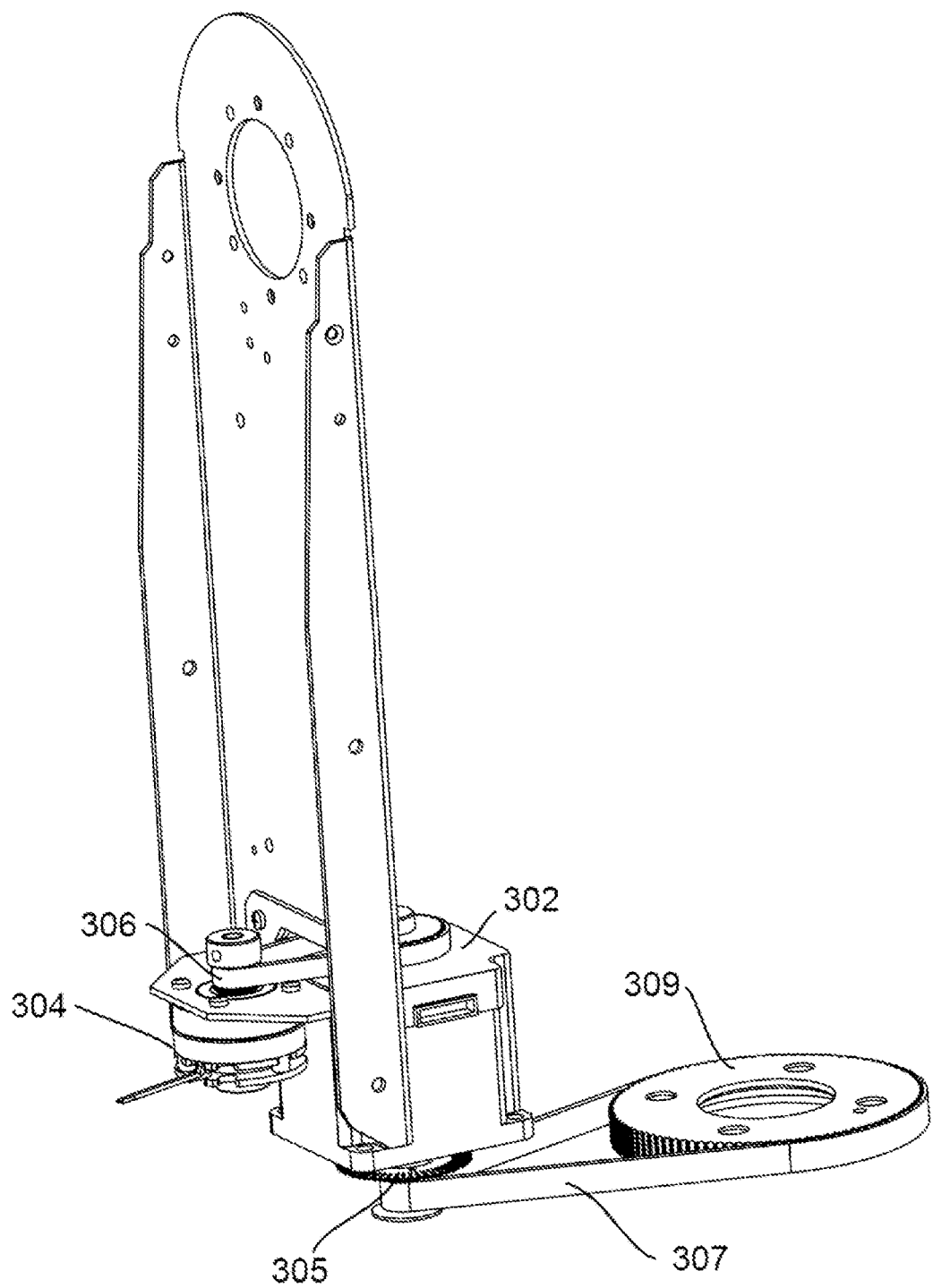
FIG. 4 presents a detail view of the pan system of the pan and tilt yoke shown in FIG. 3.

FIG. 4 presents a detail view of the pan system of the pan and tilt yoke 300 shown in FIG. 3. In FIG. 4, the pan system is removed from most of the pan and tilt yoke 300 in order to be shown more clearly. It may be seen in FIG. 4 that the first end of the motor shaft of the pan motor 302 is mechanically coupled via the pan drive belt 307 to a main pan gear 309, which is mechanically coupled to an element of the bearing 308 shown in FIG. 3. A pan quadrature encoder wheel 305 is also coupled to the first end of the motor shaft of the pan motor 302. The pan quadrature encoder wheel 305 is sensed by a pan optical sensor (not shown in FIG. 4), which is electrically coupled to the control system 200 to send signals related to rotation and speed information of the pan motor 302 to the processor 202. The pan quadrature encoder wheel 305 and the pan optical sensor together may be referred to as a pan motion quadrature encoder system.

Figure 5:
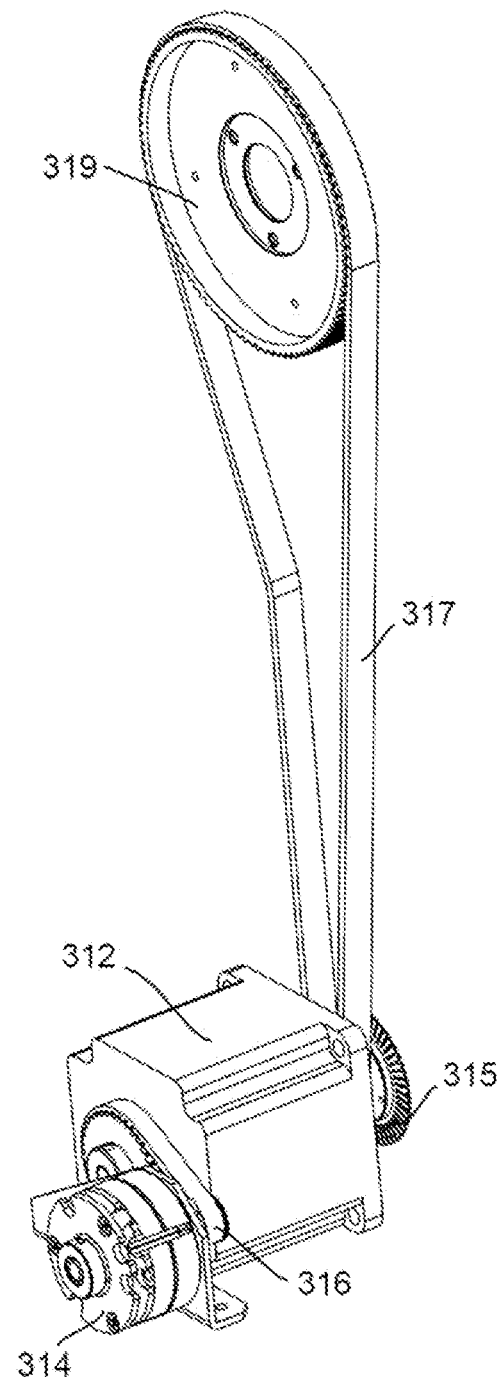
FIG. 5 presents a detail view of the tilt system of the pan and tilt yoke shown in FIG. 3.

FIG. 5 presents a detail view of the tilt system of the pan and tilt yoke 300 shown in FIG. 3. In FIG. 5, the tilt system is removed from the pan and tilt yoke 300 in order to be shown more clearly. It may be seen in FIG. 5 that the first end of the motor shaft of tilt motor 312 is mechanically coupled via the tilt drive belt 317 to a main tilt gear 319, which is mechanically coupled to an element of the bearing 318 shown in FIG. 3. A tilt quadrature encoder wheel 315 is also coupled to the first end of the motor shaft of the tilt motor 312. The tilt quadrature encoder wheel 315 is sensed by a tilt optical sensor (not shown in FIG. 5), which is electrically coupled to the control system 200 to send signals related to rotation and speed information of the tilt motor 312 to the processor 202. The tilt quadrature encoder wheel 315 and the tilt optical sensor together may be referred to as a tilt motion quadrature encoder system.

The control system 200 executes instructions in the memory 204 that comprise a motion control system 216 that controls the pan and tilt movement systems 301 and 311 of FIG. 3. The pan and tilt movement systems 301 and 311 do not have an absolute position encoder; instead they have pan and tilt quadrature encoder wheels 305 and 315 that control pan and tilt counters to measure relative motion of the pan and tilt motors 302 and 312. In some embodiments (taking the pan system 301 as an example), the motion control system 216 calibrates an absolute pan position of the luminaire head in the pan axis of rotation upon power up of the luminaire 12 using a calibration process that comprises driving the pan movement system 301 in a first direction until a first motion end stop is reached, storing a first pan counter value, driving the movement system 301 in a second direction until a second motion end stop is reached, and storing a second pan counter value. Thereafter, the motion control system 216 compares a current pan counter value to the first and second stored pan counter values to calculate a current absolute position of the luminaire head in the pan axis of rotation. The motion control system 216 calibrates an absolute position of the luminaire head in the tilt axis of rotation using a similar process.

In such embodiments, the time and the physical movement of the luminaire head that are required for such a position calibration process may be avoided by the processor 202 (referring again to FIG. 2), whenever the pan or tilt motion of the luminaire head is stopped (either by operator command or upon removal of power from the luminaire 12), obtaining from the motion control system 216 a current calculated absolute pan and/or tilt position of the luminaire head and storing the obtained positions in non-volatile memory 214 of the memory 204. An Enable Calibration command signal, received via the data link 14, allows an operator of the luminaire 12 to select whether the control system 200 performs the position calibration process described above on power up or initializes the motion control system 216 with calculated absolute pan and tilt positions that were stored before the luminaire 12 was last powered down. In some embodiments, the luminaire 12 may default to initializing with the stored positions and not perform the position calibration process until commanded to do so by an operator.

For example, if the luminaire 12 is being used in a theatre or other venue where the fixtures are typically not touched between shows, position calibration may be disabled and stored absolute pan and tilt positions used instead. Similarly, where the luminaire 12 is protruding through a small hole in scenery or is in a mounting position where head movement is restricted by set pieces or truss elements, the luminaire 12 may be calibrated using head movement before it is mounted in position, and position calibration disabled thereafter to avoid damage to set pieces or to the luminaire 12 itself. On the other hand, where the luminaire 12 is taken from its mounting position and reoriented by hand for packing into a travel container, the position calibration process is required upon power up, as the luminaire head will not likely be in the same orientation it was when the luminaire 12 was powered off.

Figure 6:
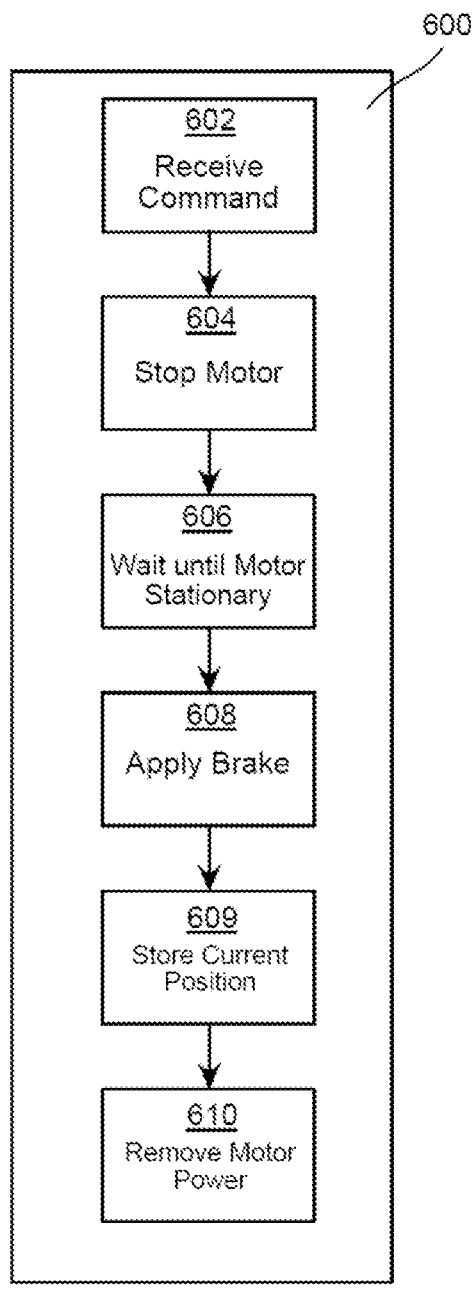
FIG. 6 presents a flow chart of a process for engaging the pan braking system of an automated luminaire according to the disclosure.

FIG. 6 presents a flow chart of a process 600 for engaging the pan braking system 304 of an automated luminaire according to the disclosure. The same process may be used to engage the tilt braking system 314. Similarly, the process 600 may be used to control the braking systems 904, 914, 1004, and 1104 of FIGS. 9-11. In step 602, the processor 202 receives an Engage Brake command signal via the data link 14, specifying that one or both motor brakes be applied. In some embodiments, the Engage Brake command signal comprises a command parameter having a value that includes a pan flag and/or a tilt flag, the flags selecting whether one or both of the associated pan and tilt braking systems 304 and 314 are to be engaged. In other embodiments, the Engage Brake command signal includes no parameter data and commands the processor 202 to engage both pan and tilt braking systems 304 and 314 or only a predetermined one of the pan and tilt braking systems 304 and 314.

If the pan braking system 304 is to be engaged, in step 604 the processor 202 responds to the Engage Brake command signal by determining whether the pan motor 302 is currently rotating or is stationary. If the pan motor 302 is stationary, the process 600 continues at step 608, described below. If the pan motor 302 is rotating, in step 604 the processor 202 responds to the Engage Brake command signal by causing the rotation of the pan motor 302 to stop electrically. In some embodiments, the pan motor 302 may be caused to stop electrically by reducing the pulse frequency (and/or reducing the current) of electrical signals applied to the pan motor 302, taking into account the momentum of the moving head by calculating deceleration and velocity profiles to provide a smooth slow down and stop. In other embodiments, pulses to cause the motor to accelerate in the direction opposite of the current direction of travel (perhaps at an increased current) may be applied to the pan motor 302 to cause it to stop electrically. In still other embodiments, the windings of the pan motor 302 may be electrically shorted, to cause induced electromotive force to slow and stop the pan motor 302.

Stopping a pan motor 302 is not an instantaneous process—the pan motor 302 takes some period of time to slow down and stop the mass of the luminaire head 12*a*. Accordingly, in step 606 the processor 202 waits until it receives signals from the pan movement system 301 that the pan motor 302 is stationary. In some embodiments, motion of the pan motor 302 is determined by checking signals from the pan optical sensor relating to motion of the pan quadrature encoder wheel 305, as described with reference to FIG. 4. When the pan optical sensor (or other feedback system) indicates that the pan motor 302 is stationary, then in step 608, the processor 202 removes power from the pan braking system 304 to allow it to engage the brake under spring force.

In step 609, the processor 202 stores a current calculated absolute pan position of the head in the non-volatile memory 214. Finally, in step 610, after a short delay (if needed to ensure that the pan braking system 304 has fully engaged), the processor 202 removes any holding current applied to the pan motor 302 as part of stopping the pan motor 302 in step 604, thereby removing power from the pan motor 302.

The step 609 is optional. In some embodiments, it may be performed after the step 610 instead of before or in parallel with. In embodiments where a position calibration process is always performed, the step 609 may not be performed at all.

In some embodiments, steps 604, 606, 608, 609, and 610 may be performed for the pan motor 302 and the pan braking system 304 independently and in parallel to performing the same steps for the tilt motor 312 and the tilt braking system 314.

In some embodiments, when the control system 200 determines that electrical power has been removed from the luminaire 12 (for example by disconnecting from mains power or switching off a power switch) while the luminaire head is in motion, the process 600 is performed for both the pan and/or tilt movement systems 301 and 311. In such embodiments, the power supply (which in some embodiments includes a battery) is designed to keep the control system 200 and the pan and tilt movement systems 301 and 311 powered for long enough to complete the process 600 for both pan and tilt. The processor 202 may determine that power has been removed from the luminaire 12 by sensing whether electrical power is currently applied to other elements of the control system 200 or to other subsystems of the luminaire 12.

In some embodiments, the Engage Brake command signal includes a control parameter with flags specifying whether power is to be removed from the pan and/or tilt motors once the pan and/or tilt brakes are engaged. If one or both flags are set, the processor 202 does not remove power from corresponding ones of the pan and tilt motors 302 and 312 in step 610 that is, it continues to apply a holding current to corresponding ones of the pan and tilt motors 302 and 312. Applying the brakes but not removing power from the motors would allow the system to be resistant to displacement by external forces, but also to be ready to start up again more quickly once the brakes are disengaged. For example, in scenarios where an automated luminaire according to the disclosure is attached to a truss that moves during a performance, the operator might command the automated luminaire to apply the brakes, in order to ensure that the luminaire head does not change orientation while the truss is moving, but to continue applying a holding current to the motors, in order to keep the automated luminaire ready to begin pan and/or tilt motion again as quickly as possible, after the truss is repositioned.

Figure 7:
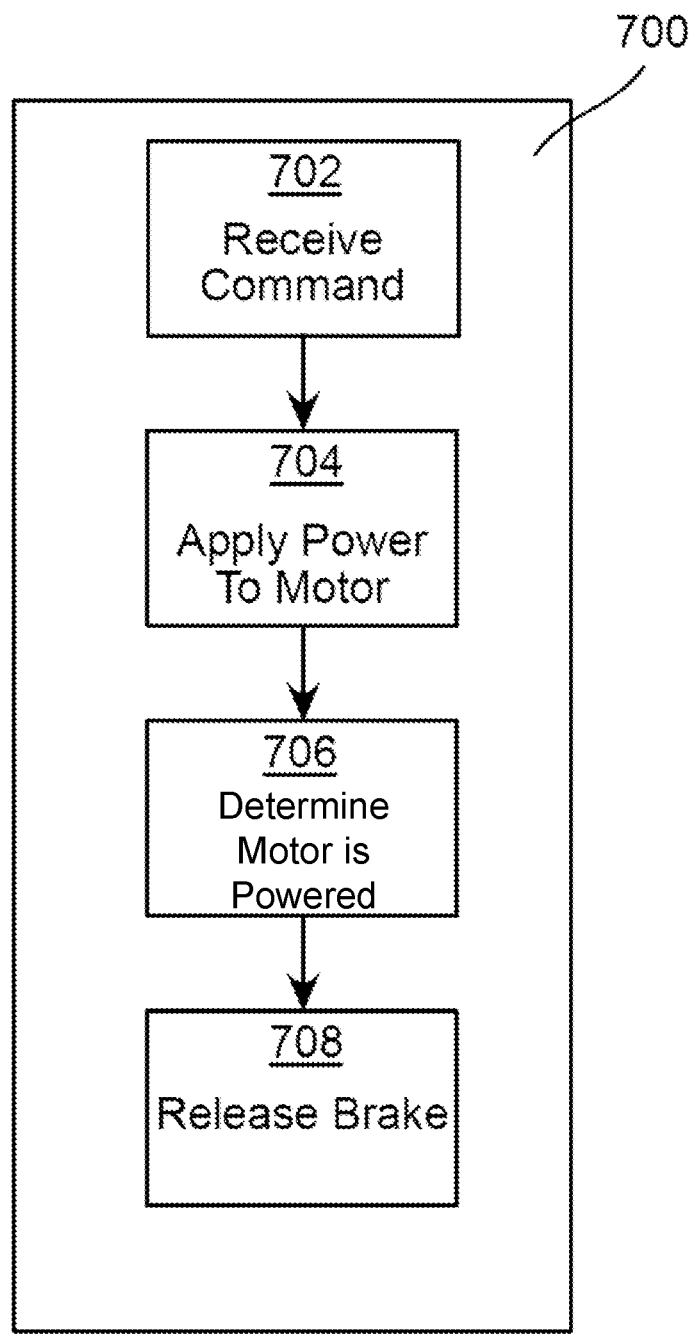
FIG. 7 presents a flow chart of a process for releasing (disengaging) the pan braking system of an automated luminaire according to the disclosure.

FIG. 7 presents a flow chart of a process 700 for releasing (disengaging) the pan braking system 304 of an automated luminaire according to the disclosure. The same process may be used to release the tilt braking system 314. Similarly, the process 700 may be used to release the braking systems 904, 914, 1004, and 1104 of FIGS. 9-11. In step 702, the processor 202 receives a Disengage Brake command signal via the data link 14 specifying that one or both motor brakes be released. In step 704, the processor 202 reacts to the Disengage Brake command signal by causing power (for example the holding current or another current less than that required to initiate motion) to be applied to the pan motor 302.

In step 706, the processor 202 determines whether power has been applied to the pan motor 302. In some embodiments, the processor 202 determines that power has been applied by waiting for a preset period of time before proceeding to step 708. This preset period can be established during design of the product by measuring a rise time of the motor current. Such a rise time may be a function of the inductance of the motor coils, the voltage applied, the capacity of the power supply, and the impedance of the power supply and electrical connections. In other embodiments, the processor 202 may be electrically coupled to respective pan and tilt motor current sensors and the processor 202 determines that power has been applied when the motor currents reach preset threshold values. Once it has been determined in step 706 that power has been applied to the pan motor 302, in step 708, the processor 202 applies power to the pan braking system 304, thereby releasing (or disengaging) the brake.

In some embodiments, steps 704, 706, and 708 may be performed for the pan motor 302 and the pan braking system 304 independently and in parallel to the tilt motor 312 and the tilt braking system 314. As described with reference to FIG. 6, in some embodiments, according to control parameter flags in the Engage Brake command signal, power may not be removed from pan and tilt motors 302 and 312. In such embodiments, steps 704 and 706 of the process 700 may be skipped, as power will already be applied to one or both of the pan and tilt motors 302 and 312.

Figure 8:
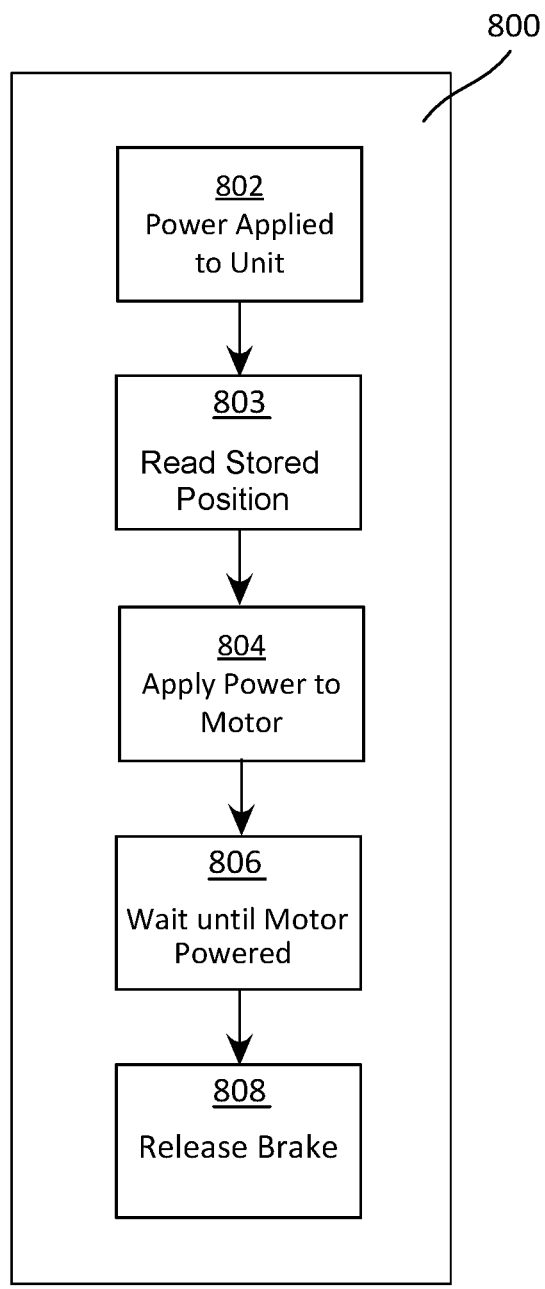
FIG. 8 presents a flow chart of a process performed at power up of an automated luminaire according to the disclosure.

FIG. 8 presents a flow chart of a process 800 performed at power up of an automated luminaire according to the disclosure. The process 800 is used in embodiments that perform step 609 of the process 600, where the processor 202 stores a current calculated absolute pan position of luminaire mechanisms in the non-volatile memory 214 when the pan motor 302 is brought to a stop. The process 800 releases (or disengages) the pan braking system 304 of the luminaire 12. The process 800 may also be used to release the tilt braking system 314. Similarly, the process 800 may be used to release the braking systems 904, 914, 1004, and 1104 of FIGS. 9-11.

In step 802, the processor 202 determines that electrical power has been applied to the luminaire 12. Power may be applied to the luminaire 12 by switching on a power switch or otherwise connecting the luminaire 12 to mains power. The processor 202 may determine that power has been applied to the luminaire 12 by recognizing instructions currently being executed as power-on startup instructions. Where the processor 202 is battery powered, it may determine that power has been applied to the luminaire 12 by sensing electrical power applied to other elements of the control system 200 or to other subsystems of the luminaire 12. In step 803, the processor 202 reads the calculated absolute pan and/or position of the head that were stored in the non-volatile memory 214 when the pan and tilt motors 302 and 312 are last brought to a stop.

Steps 804, 806, and 808 are similar to steps 704, 706, and 708 of the process 700. In step 804, the processor 202 causes power to be applied to the pan motor 302. In step 806, the processor 202 waits until the power has been applied to the pan motor 302. Once step 806 is complete, in step 808, the processor 202 applies power to the pan braking system 304, thereby releasing the brake.

Figure 9:
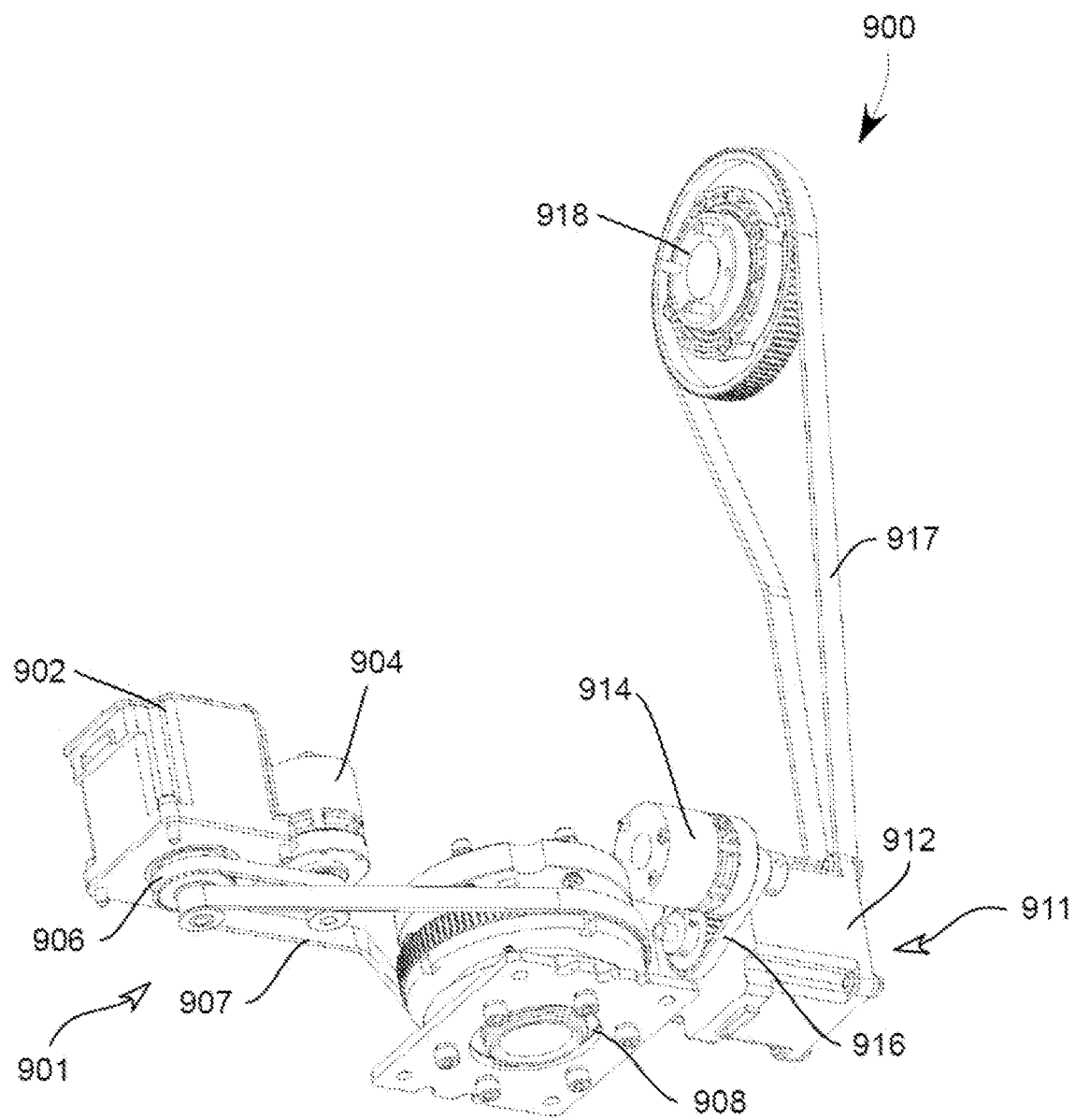
FIG. 9 presents a view of second pan and tilt movement systems of an automated luminaire according to the disclosure.

FIG. 9 presents a view of second pan and tilt movement systems 900 of an automated luminaire according to the disclosure. In FIG. 9, the yoke framework is not shown in order to show the second pan and tilt movement systems 900 more clearly. The pan and tilt movement systems 900 include a pan movement system 901 and a tilt movement system 911.

The pan movement system 901 comprises a pan motor 902, which is a stepper motor, direct current (DC) servo motor, or other suitably powerful motor type. The pan motor 902 is configured to cause rotation of the yoke relative to a fixed support around a pan axis of rotation passing through a bearing 908. A motor shaft extends from one side of the pan motor 902. The motor shaft of the pan motor 902 is coupled via a belt 907 to an element of the bearing 908 to rotate the yoke relative to the fixed support around a pan axis of rotation. In other embodiments, the pan motor 902 may be coupled to the element of the bearing 908 by a gear train or other suitable drive mechanism. The motor shaft of the pan motor 902 is further mechanically coupled (on the same side of the pan motor 902 as the belt 907) to a pan braking system 904 via a belt 906. The pan braking system 904 is an electrically controllable brake using a magnetic system to provide braking torque to inhibit or prevent rotation of the pan and tilt yoke (and thus the luminaire head) by inhibiting or preventing rotation of the motor shaft of the pan motor 902.

The tilt movement system 911 comprises a tilt motor 912. The tilt motor 912 is a stepper motor, DC servo motor, or other suitably powerful motor type. The tilt motor 912 is configured to cause rotation of a luminaire head (not shown in FIG. 9) relative to the yoke around a tilt axis of rotation passing through a bearing 918. The tilt axis of rotation is orthogonal to the pan axis of rotation. A motor shaft of the tilt motor 912 extends from opposite sides of the tilt motor 912. A first end of the motor shaft of the tilt motor 912 is coupled via a belt 917 to an element of the bearing 918 to rotate the luminaire head about a tilt axis relative to the yoke. In other embodiments, the pan motor 912 may be coupled to the element of the bearing 918 by a gear train or other suitable drive mechanism. A second end of the motor shaft of the tilt motor 912 (on the opposite side of the tilt motor 912 from the first end of the motor shaft) is mechanically coupled via a belt 916 to a tilt braking system 914. The tilt braking system 914 is an electrically controllable brake using a magnetic system to provide braking torque to inhibit or prevent rotation of the luminaire head by inhibiting or preventing rotation of the motor shaft of the tilt motor 912.

The disclosed braking system is not limited to use on pan and tilt systems of automated luminaires and may be used on any motor-controlled feature within the luminaire. For example, optical devices such as zoom and focus lenses can be large and heavy and may move away from a desired position under the force of gravity when power is not applied to their respective drive motors. Similarly, an optical device such as a prism wheel may include thicker, heavier prisms in one part of the wheel and thinner, light prisms in the rest of the wheel, which may cause it to rotate away from a desired position under the force of gravity when power is not applied to its drive motor. In some embodiments, braking systems according to the disclosure are used to prevent such unwanted movement.

Figure 10:
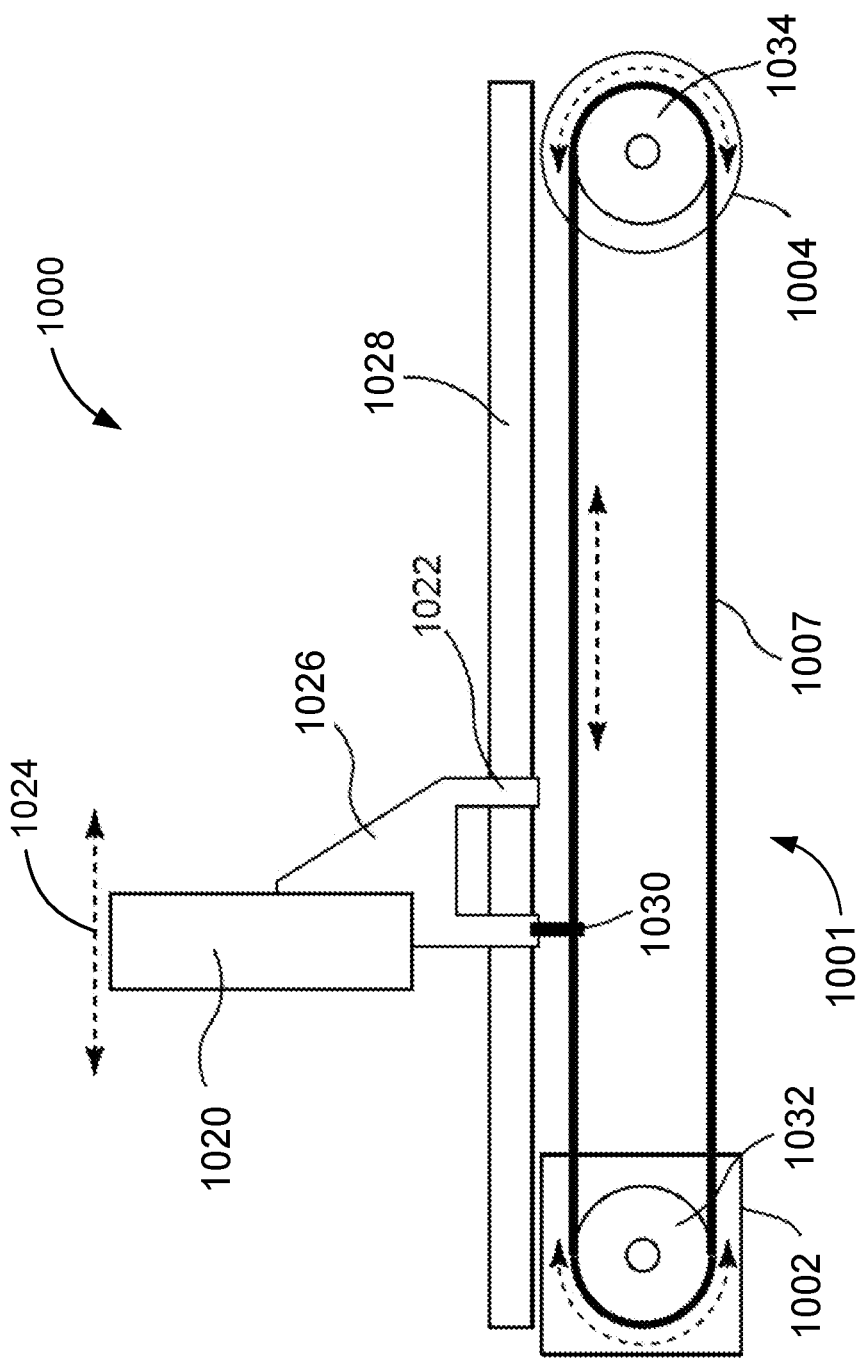
FIG. 10 presents a schematic view of a first lens system of an automated luminaire according to the disclosure.

FIG. 10 presents a schematic view of a first lens system 1000 of an automated luminaire according to the disclosure. A lens movement system 1001 comprises a lens motor 1002, which is a stepper motor, direct current (DC) servo motor, or other suitably powerful motor type. The lens motor 1002 is configured to cause movement (indicated by arrow 1024) of a lens (or lens system) 1020 along an optical axis of the automated luminaire. A motor shaft of the lens motor 1002 is coupled via a drive pulley 1032 to a drive belt 1007. The drive belt 1007 passes around a driven pulley 1034 and is coupled to a lens carriage 1026 by a coupling 1030. The lens carriage 1026 includes travelers 1022, which slide along a support rod 1028. The lens 1020 is supported by the lens carriage 1026. The driven pulley 1034 is mounted on a shaft that couples the driven pulley 1034 to a braking system 1004. The braking system 1004 is an electrically controllable brake using a magnetic system to provide braking torque to inhibit or prevent rotation of the driven pulley 1034, thus preventing movement of the drive belt 1007, rotation of the motor shaft of the lens motor 1002, and movement of the lens carriage 1026 and the lens 1020.

Although the braking system 1004 is mechanically coupled to the driven pulley 1034, in other embodiments according to the disclosure the braking system 1004 may be mounted to the drive pulley 1032, to either end of the motor shaft of the motor 1002, or to an additional pulley or gear that is rotatably coupled to the drive belt 1007.

Figure 11:
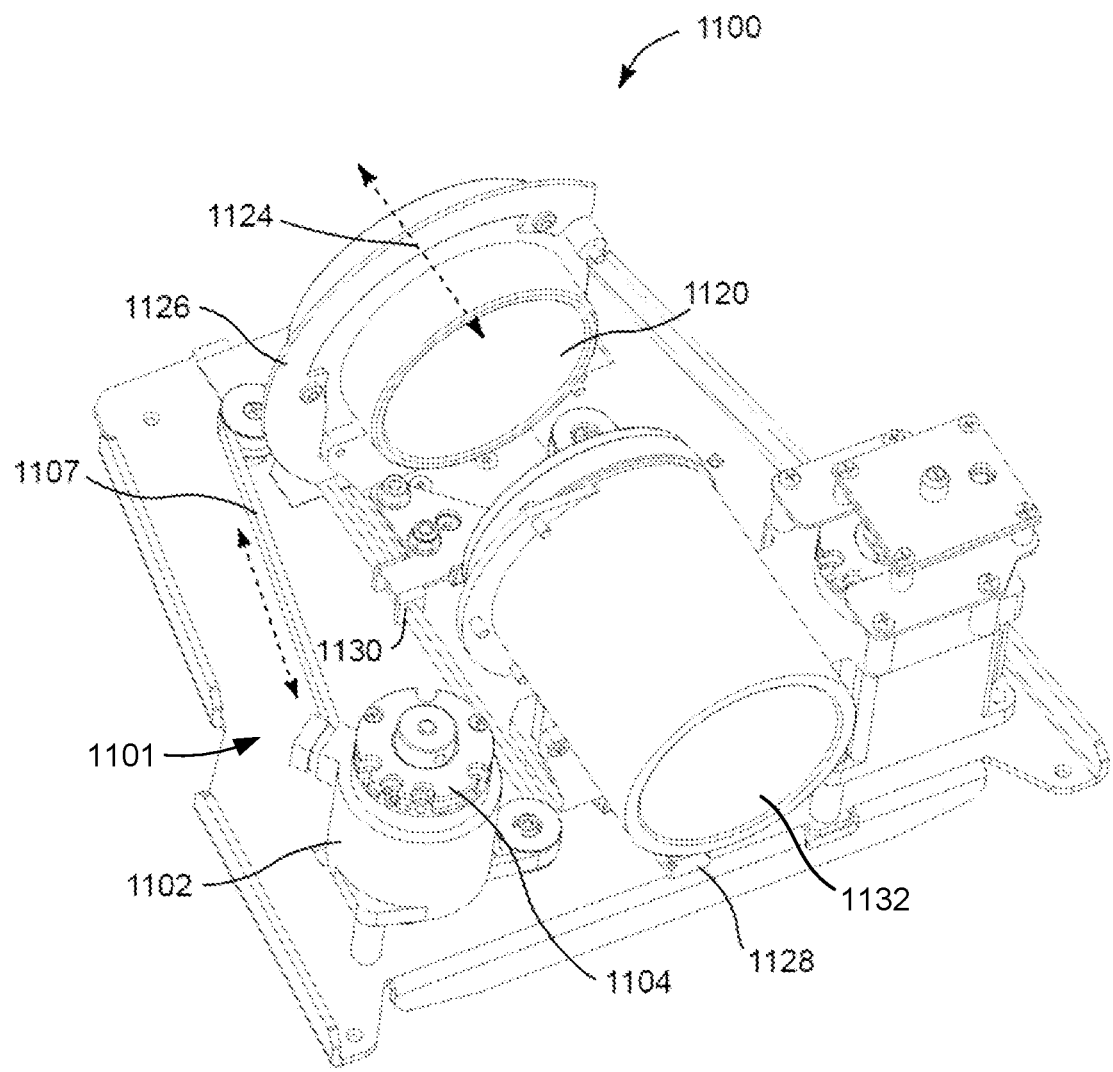
FIG. 11 presents a schematic view of a second lens system of an automated luminaire according to the disclosure.

Although systems with a belt drive from the motor to the brakes are described, braking systems according to the disclosure are not so limited. In other embodiments, the motor brakes may be coupled to the motor shafts via gears, via direct connection (as shown in FIG. 11) to either end of the motor shaft of motor 302, 312, 902, 912, or 1020, or via drive belts 307, 317, 907, 917, or 1007. In still other embodiments, the brakes may be coupled to driven shafts (e.g., shafts that are coupled to the main pan gear 309 or the main tilt gear 319) rather than to the motor shafts.

FIG. 11 presents a schematic view of a second lens system 1100 of an automated luminaire according to the disclosure. The lens system 1100 comprises a zoom lens (or zoom lens group) 1120 and a focus lens (or focus lens group) 1132. The zoom lens 1120 is moved (as indicated by arrow 1124) along an optical axis of the automated luminaire by a lens movement system 1101, comprising a lens motor 1102, which is a stepper motor, direct current (DC) servo motor, or other suitably powerful motor type. A first part of a motor shaft extends from a first side of the lens motor 1102 (the bottom side as shown in FIG. 11) and is coupled via a drive pulley (not shown in FIG. 11) to a drive belt 1107. The drive belt 1107 passes around two ancillary pulleys, between which the drive belt 1107 is coupled to a lens carriage 1126 by a coupling 1130. The lens carriage 1126 slides along a support rod 1128. The zoom lens 1120 is supported by the lens carriage 1126.

A second part of a motor shaft extends from a second side of the lens motor 1102 (the top side as shown in FIG. 11) and is directly coupled to a braking system 1104. The braking system 1104 is an electrically controllable brake using a magnetic system to provide braking torque to inhibit or prevent rotation of the motor shaft of the lens motor 1102, thus inhibiting or preventing movement of the drive belt 1107 and movement of the lens carriage 1126 and the lens 1120.

The focus lens 1132 is moved along the optical axis of the automated luminaire by a similar lens movement system that is not shown in FIG. 11.

The lens movement systems 1001 and 1101 are belt driven systems, but in other embodiments a worm drive or cam drive with a braking system according to the disclosure may be used for lens movement. In such embodiments, the braking system may be coupled to a motor shaft or to the lens carriage.

In some embodiments, the braking friction of one or more of the braking systems 304, 314, 904, 914, 1004, or 1104 can be adjusted manually. In other embodiments, the control system 200 is configured to adjust the braking friction of one or more of the braking systems 304, 314, 904, 914, 1004, or 1104 electrically in response to a Braking Friction command received via the data link 14, the Braking Friction command comprising data representing a desired amount of braking friction of the one or more of the braking systems 304, 314, 904, 914, 1004, or 1104.

As one or more of the braking systems 304, 314, 904, 914, 1004, and 1104 may be configured to engage automatically when power is removed from the luminaire 12, the brakes themselves may be designed or selected for a reduced holding or braking torque, allowing an operator to overcome the torque to, for example for braking systems 304, 314, 904, and 914, manually realign the pan or tilt position of the luminaire head without using the motors. This also allows the operator to reposition pan and tilt when the unit is powered down (or otherwise ceases to receive electrical power), to allow aligning the yoke and/or luminaire head in a desired orientation to place the unit in a road case or other packaging. However, the reduced holding torque is selected to be sufficient to prevent the luminaire head or optical device from moving under gravity even when the internal components cause the luminaire head or optical device to be out of balance. In one such embodiment, the braking torque is 30% of the motor torque. However, the required braking torque may vary over a range of approximately 25% to 150% of the motor torque in other embodiments.

In other embodiments, the braking systems 304, 314, 904, 914, 1004, and 1104 are designed such that the brakes are automatically disengaged when the luminaire ceases to receive electrical power. For example a spring may act to disengage the spring and electrical power be applied to engage the brake. In such embodiments, when motion of the luminaire head is stopped by operator command, the braking systems 304, 314, 904, 914, 1004, and 1104 may be engaged to hold the head or optical device in position, but when the luminaire is disconnected from the main power supply, the brakes are disengaged, to allow easy manual manipulation of, for example, the head position by an operator or technician.

For either type of brake (powered/engaged or unpowered/engaged), in some embodiments an additional mechanism (such as a latching solenoid) may be added to allow the brake to operate selectively as either powered/engaged or unpowered/engaged (or vice versa). In some such embodiments, the control system 200 responds to a command parameter of a Power Off Braking command signal received via the data link 14 by causing all or selected ones of braking systems 304, 314, 904, 914, 1004, and 1104 to remain in their current state when the luminaire ceases to receive electrical power. That is, the selected braking system remains engaged if it is currently engaged when power is removed, and remains disengaged if it is currently disengaged when power is removed.

In some embodiments, any of braking systems 304, 314, 904, 914, 1004, and 1104 may comprise a first element fixedly coupled (directly, by belt, or other coupling) to and rotating with the motor shaft and a second element biased by a spring to apply friction to the first element unless disengaged from the first element by an electromagnetic force. The second element is coupled to the chassis by a coupling that prevents rotation of the second element relative to the chassis, but allows motion toward and away from the first element.

In still other embodiments, the receipt of an Engage Brake command signal (enabling motor brakes) will inhibit response by the control system 200 to a Motion command to move the luminaire head in the pan and/or tilt axes that is received via the data link 14. In such embodiments, the response remains inhibited until a Disengage Brake command signal to release one or both of the brakes has been received. Thus, the operator can be assured that the luminaires will not move accidentally or inadvertently, due to pan and tilt commands received via the data link 14.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions and alterations can be made hereto without departing from the spirit and scope of the disclosure.

What is claimed is:

1. A luminaire comprising:
    a luminaire head comprising one or more optical devices;
    a movement system mechanically coupled to the luminaire head and configured to rotate the luminaire head around an axis of rotation, the movement system comprising:
        a motor comprising a motor shaft having a first part extending from a first side of the motor, the first part of the motor shaft coupled via a first mechanical coupling to the luminaire head and configured to cause rotation of the luminaire head about the axis of rotation;
        a braking system coupled via a second mechanical coupling to the motor shaft and configured to inhibit rotation of the luminaire head; and
    a control system comprising a processor electrically coupled to the motor and the braking system, the control system configured to engage the braking system by:
        determining whether the motor is rotating;
        engaging the braking system when it is determined that the motor is not rotating; and
        removing power from the motor after engaging the braking system.

2. The luminaire of claim 1, wherein the control system is configured to disengage the braking system by:
    causing power to be applied to the motor;
    determining whether power has been applied to the motor; and
    disengaging the braking system when it is determined that power has been applied to the motor.

3. The luminaire of claim 2, wherein the control system is configured to determine whether power has been applied to the motor by sensing a current applied to the motor.

4. The luminaire of claim 2, wherein the control system is configured to receive a Motion command via a data link and rotate the motor in response to the Motion command only when the braking system is disengaged.

5. The luminaire of claim 1, wherein the braking system is coupled to the first part of the motor shaft.

6. The luminaire of claim 1, the motor shaft having a second part extending from a second side of the motor, wherein the braking system is coupled to the second part of the motor shaft.

7. The luminaire of claim 1, wherein the braking system is coupled directly to the motor shaft.

8. The luminaire of claim 1, wherein the braking system is configured to inhibit rotation of the luminaire head when the luminaire ceases to receive electrical power.

9. The luminaire of claim 1, wherein the control system is configured to:
    receive a Braking Friction command via a data link, the Braking Friction command comprising data representing a desired amount of braking friction of the braking system; and
    adjust a braking friction of the braking system electrically in response to the data of the Braking Friction command.

10. A luminaire comprising:
    a luminaire head comprising one or more optical devices;
    a movement system mechanically coupled to a first optical device of the one or more optical devices and configured to move the first optical device, the movement system comprising:
        a motor comprising a motor shaft having a first part extending from a first side of the motor, the first part of the motor shaft coupled via a first mechanical coupling to the first optical device and configured to cause motion of the first optical device;
        a braking system coupled via a second mechanical coupling to the motor shaft and configured to inhibit movement of the first optical device; and
    a control system comprising a processor electrically coupled to the motor and the braking system, the control system configured to engage the braking system by:
        determining whether the motor is rotating;
        engaging the braking system when it is determined that the motor is not rotating; and
        removing power from the motor after engaging the braking system.

11. The luminaire of claim 10, wherein the braking system is coupled to the first part of the motor shaft.

12. The luminaire of claim 10, the motor shaft having a second part extending from a second side of the motor, wherein the braking system is coupled to the second part of the motor shaft.

13. The luminaire of claim 10, wherein the braking system is coupled directly to the motor shaft.

14. The luminaire of claim 10, wherein the braking system is configured to inhibit movement of the first optical device when the luminaire ceases to receive electrical power.

15. The luminaire of claim 10, wherein the control system is configured to disengage the braking system by:
    causing power to be applied to the motor;
    determining whether power has been applied to the motor; and
    disengaging the braking system when it is determined that power has been applied to the motor.

16. A luminaire comprising:
    a luminaire head comprising one or more optical devices;
    a movement system mechanically coupled to a luminaire mechanism of the luminaire and configured to move the luminaire mechanism, the movement system comprising:
        a motor comprising a motor shaft having a first part extending from a first side of the motor, the first part of the motor shaft coupled via a first mechanical coupling to the luminaire mechanism and configured to cause motion of the luminaire mechanism;
        a braking system coupled via a second mechanical coupling to a shaft of the motor and configured to inhibit movement of the luminaire mechanism; and
    a control system comprising a processor electrically coupled to the motor, the braking system, and a non-volatile memory, the control system configured to engage the braking system by:
        determining whether the motor is rotating; and
        upon determining that the motor is not rotating:
            engaging the braking system;
            removing power from the motor after engaging the braking system; and
            storing in the non-volatile memory a current absolute position of the luminaire mechanism.

17. The luminaire of claim 16, wherein the control system is configured to disengage the braking system by:
    causing power to be applied to the motor;

determining whether power has been applied to the motor; and disengaging the braking system when it is determined that power has been applied to the motor.

18. The luminaire of claim 17, wherein the control system is configured to prepare the movement system for motion by, prior to disengaging the braking system:

reading the current absolute position of the luminaire head from the non-volatile memory; and initializing a motion control system with the current absolute position.

19. The luminaire of claim 18, wherein the control system is configured, in response to an Enable Calibration command previously received by the control system via a data link, to cause the motion control system to perform a position calibration process when it is determined that power has been applied to the luminaire.

20. The luminaire of claim 16, wherein the braking system is coupled to the first part of the motor shaft.

21. The luminaire of claim 16, the motor shaft having a second part extending from a second side of the motor, wherein the braking system is coupled to the second part of the motor shaft.

22. The luminaire of claim 16, wherein the braking system is coupled directly to the motor shaft.

23. The luminaire of claim 16, wherein the braking system is configured to inhibit movement of the luminaire mechanism when the luminaire ceases to receive electrical power.

* * * * *